(12) United States Patent
Sakai et al.

(10) Patent No.: US 11,270,682 B2
(45) Date of Patent: Mar. 8, 2022

(54) INFORMATION PROCESSING DEVICE AND INFORMATION PROCESSING METHOD FOR PRESENTATION OF WORD-OF-MOUTH INFORMATION

(71) Applicant: SONY CORPORATION, Tokyo (JP)

(72) Inventors: Yusuke Sakai, Kanagawa (JP);
Yasuhide Hosoda, Kanagawa (JP);
Shingo Utsuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 128 days.

(21) Appl. No.: 16/613,163

(22) PCT Filed: May 2, 2018

(86) PCT No.: PCT/JP2018/017504
§ 371 (c)(1),
(2) Date: Nov. 13, 2019

(87) PCT Pub. No.: WO2018/225429
PCT Pub. Date: Dec. 13, 2018

(65) Prior Publication Data
US 2021/0082392 A1   Mar. 18, 2021

(30) Foreign Application Priority Data
Jun. 9, 2017   (JP) .............................. JP2017-114520

(51) Int. Cl.
*G10L 13/027*   (2013.01)
*H04W 4/38*   (2018.01)
(Continued)

(52) U.S. Cl.
CPC .......... *G10L 13/027* (2013.01); *G06F 16/383* (2019.01); *G10L 13/086* (2013.01); *H04W 4/38* (2018.02)

(58) Field of Classification Search
CPC ...... G10L 13/027; G10L 13/047; G10L 13/08
(Continued)

(56) References Cited

U.S. PATENT DOCUMENTS 7,428,429 B2 *   9/2008   Gantz ..................... H04M 1/05
455/344
8,285,571 B2 *   10/2012   Demirdjian ........... G01S 13/825
705/6
(Continued)

FOREIGN PATENT DOCUMENTS

JP   2014-115697 A   6/2014
JP   2016-136355 A   7/2016
(Continued)

OTHER PUBLICATIONS

International Search Report and Written Opinion of PCT Application No. PCT/JP2018/017504, dated Jul. 17, 2018, 11 pages of ISRWO.

*Primary Examiner* — Susan I McFadden
(74) *Attorney, Agent, or Firm* — Chip Law Group

(57) ABSTRACT

There is provided an information processing device and an information processing method that are able to audibly present, to a user, word-of-mouth information in accordance with the user's latent demand. The information processing device that includes a controller that performs control to estimate a latent demand on the basis of a current user condition, search for word-of-mouth information corresponding to the demand, and present the searched word-of-mouth information to a user.

10 Claims, 11 Drawing Sheets

(51) Int. Cl.
  *G06F 16/383* (2019.01)
  *G10L 13/08* (2013.01)
(58) Field of Classification Search
  USPC .......................................................... 704/260
  See application file for complete search history.

(56) References Cited

U.S. PATENT DOCUMENTS

| | | | |
|---|---|---|---|
| 9,342,350 B2* | 5/2016 | Maruyama | G06F 9/30145 |
| 9,445,175 B2* | 9/2016 | Seo | H04M 1/035 |
| 10,489,449 B2* | 11/2019 | Barnes, Jr. | G06F 40/169 |
| 10,532,680 B2* | 1/2020 | Seibold | B60N 2/806 |
| 10,657,961 B2* | 5/2020 | Cash | H04W 4/02 |
| 10,896,457 B2* | 1/2021 | Arnett | G06Q 30/0643 |
| 10,965,764 B2* | 3/2021 | Miyajima | G06Q 50/22 |
| 2015/0254724 A1 | 9/2015 | Kusukame et al. | |

FOREIGN PATENT DOCUMENTS

| | | |
|---|---|---|
| JP | 2017-079035 A | 4/2017 |
| WO | 2014/083778 A1 | 6/2014 |
| WO | 2016/117382 A1 | 7/2016 |
| WO | 2016/194621 A1 | 12/2016 |

\* cited by examiner

| CATEGORY OF WORD-OF-MOUTH INFORMATION / CONVERSION TYPE | CATEGORY 1 (GOURMET) | CATEGORY 2 (ENTERTAINMENT) | CATEGORY 3 (RESTROOM) | ... |
|---|---|---|---|---|
| LANGUAGE | − (MAINTAIN) | ○ (CONVERT) | ○ (CONVERT) | ... |
| DIALECT | − (MAINTAIN) | − (MAINTAIN) | ○ (CONVERT) | ... |
| RELATED INFORMATION | ○ (ADD) | − (MAINTAIN) | ○ (ADD) | ... |
| GENERATION-SPECIFIC EXPRESSION | − (MAINTAIN) | ○ (CONVERT) | ○ (CONVERT) | ... |
| ... | ... | ... | ... | ... |

FIG. 5

INFORMATION PROCESSING DEVICE AND INFORMATION PROCESSING METHOD FOR PRESENTATION OF WORD-OF-MOUTH INFORMATION

CROSS REFERENCE TO RELATED APPLICATIONS

This application is a U.S. National Phase of International Patent Application No. PCT/JP2018/017504 filed on May 2, 2018, which claims priority benefit of Japanese Patent Application No. JP 2017-114520 filed in the Japan Patent Office on Jun. 9, 2017. Each of the above-referenced applications is hereby incorporated herein by reference in its entirety.

TECHNICAL FIELD

The present disclosure relates to an information processing device, an information processing method, and a program.

BACKGROUND ART

Recent development of communication technologies allows each user to use various internet services by means of a mobile terminal such as a mobile phone terminal or a smartphone. One example of the internet services includes a word-of-mouth information site on which general users' reviews (so-called word-of-mouth information) of, for example, movies, products, restaurants, or other various types of content is able to be browsed.

In relation to such a service that presents word-of-mouth information, for example, PTL 1 described below discloses a word-of-mouth-information sharing device in which reliability of the word-of-mouth information is quantitatively reviewed while a source of submission of the word-of-mouth information is concealed.

CITATION LIST

Patent Literature

PTL 1: Japanese Unexamined Patent Application Publication No. 2006-236165

SUMMARY OF THE INVENTION

Problem to be Solved by the Invention

However, existing methods for presenting word-of-mouth information are performed on a text basis. Therefore, in order to search for the word-of-mouth information that a user wishes to know, the user is required to perform input operation of text such as a search keyword.

In addition, presenting of the word-of-mouth information has been performed on the basis of an intentional demand made by a user, and hence, has not reflected a latent demand of which the user is unconscious.

In view of this circumstance, the present disclosure proposes an information processing device, an information processing method, and a program, which are able to audibly present, to a user, word-of-mouth information in accordance with the user's latent demand.

Means for Solving the Problem

According to the present disclosure, there is proposed an information processing device including performing control, by a processor, to estimate a latent demand on the basis of a current user condition, search for word-of-mouth information corresponding to the demand, and present the searched word-of-mouth information to a user.

According to the present disclosure, there is proposed an information processing method including a processor performing control to estimate a latent demand on the basis of a current user condition, search for word-of-mouth information corresponding to the demand, and present the searched word-of-mouth information to a user.

According to the present disclosure, there is proposed a program that causes a computer to function as a controller that performs control to estimate a latent demand on the basis of a current user condition, search for word-of-mouth information corresponding to the demand, and present the searched word-of-mouth information to a user.

Effects of the Invention

As described above, according to the present disclosure, it is possible to audibly present, to a user, word-of-mouth information in accordance with the user's latent demand.

It should be noted that the effects described above are not given for the limitative purpose. In addition to the effects described above or in place of the effects described above, any of the effects described in the present description or other effects comprehensible on the basis of the present description may be achieved.

BRIEF DESCRIPTION OF THE DRAWINGS

FIG. 5 is a diagram illustrating an example of a conversion table based on categories of word-of-mouth information according to the present embodiment.

MODES FOR CARRYING OUT THE INVENTION

Below, preferred embodiments according to the present disclosure will be described in detail with reference to the accompanied drawings. Note that, in the present description and the drawings, components having substantially the same functional configuration are denoted with the same reference number, and description thereof will not be repeated.

In addition, description will be given in the following order.

1. Outline of Information Processing System according to Embodiment of Present Disclosure
2. Configuration
   2-1. Configuration of Client Terminal 1
   2-2. Configuration of Server 2
3. Operating Processes
   3-1. Process of Presenting Word-of-mouth Information
   3-2. Information Converting Process
   3-3. Reviewing Process
4. Others
5. Conclusion

Figure 1:
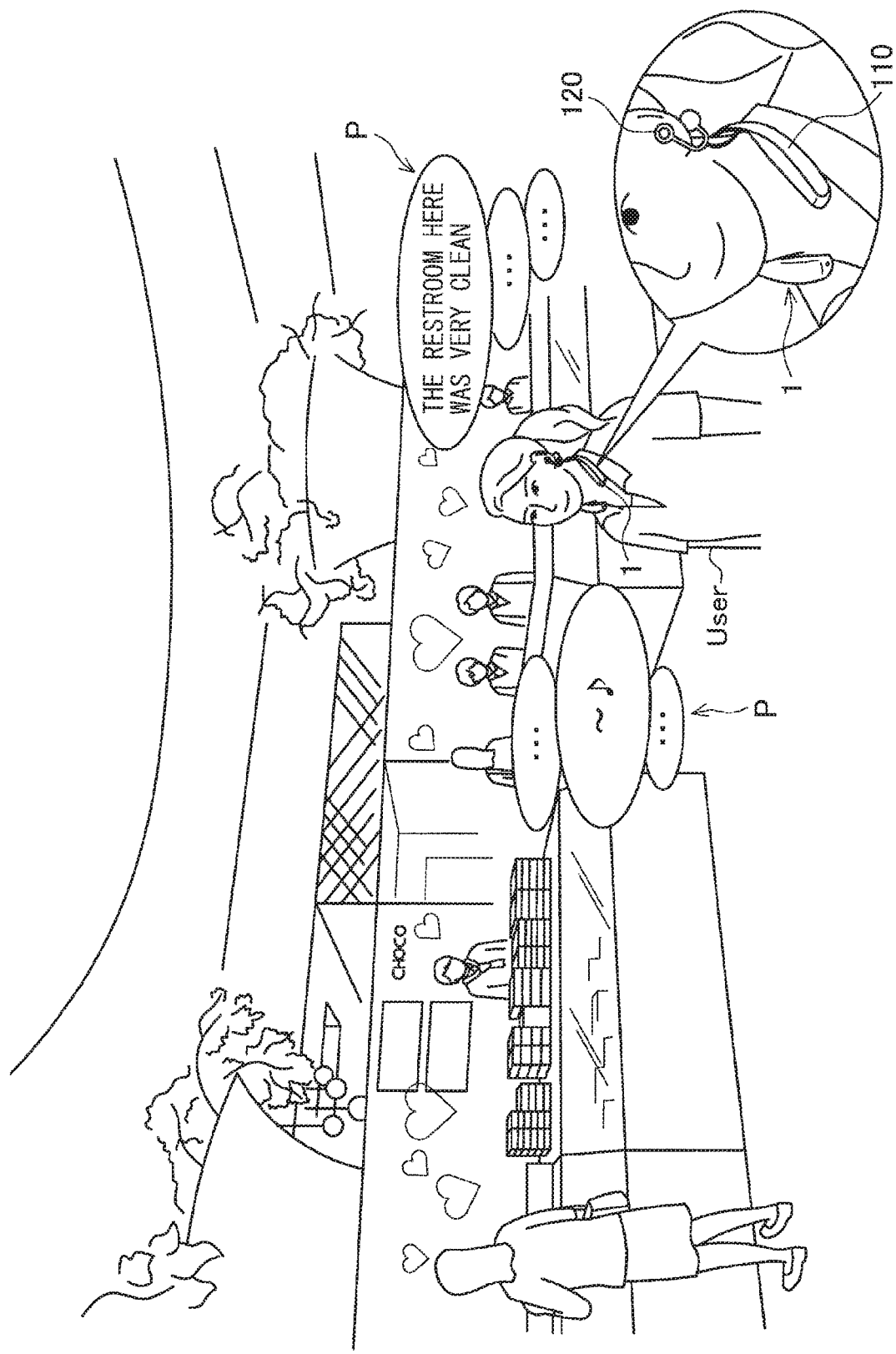
FIG. 1 is a diagram for describing an outline of an information processing system according to an embodiment of the present disclosure.

1. Outline of Information Processing System according to Embodiment of Present Disclosure FIG. 1 is a diagram for describing an outline of an information processing system according to an embodiment of the present disclosure. As illustrated in FIG. 1, the information processing system according to the present embodiment uses a client terminal 1 that a user wears, and makes it possible to audibly present word-of-mouth information P submitted by another user in a region around the user.

The client terminal 1 may include, for example, a wearable device such as a speaker (neckband speaker) of a type that is worn around the neck as illustrated in FIG. 1. A main body portion 110 of the neckband speaker includes a speaker, and is able to audibly present word-of-mouth information to the user. Note that the speaker provided on the neckband speaker uses, for example, a VPT (Virtual Phones Technology) technology, and is thereby able to give a hearing effect in which a sound is heard around the user's ear. As the word-of-mouth information is audibly presented from the neckband speaker, the word-of-mouth information is heard together with surrounding sounds, which allows the user to feel as if someone were actually whispering the word-of-mouth information around the user.

Furthermore, in a case where an earphone 120 is coupled to the main body portion 110 of the neckband speaker, it is also possible to audibly present the word-of-mouth information from the earphone 120. The earphone 120 used in the present embodiment may include an open-ear type earphone. The open-ear type earphone has a portion, to be inserted into an ear, that is formed into a ring shape (a state where an earhole is opened), and a sound is outputted from an inner surface of the ring shape. This enables the user to hear the ambient sound around the user as well as the sound (word-of-mouth information) from the earphone without the ambient sound around the user being blocked. In addition, in the example illustrated in FIG. 1, the earphone is wired to the neckband speaker. However, the present embodiment is not limited to this, and a wireless earphone that is wirelessly coupled may be used. Furthermore, the client terminal 1 may be achieved only with an earphone. Moreover, the open-ear type (a type in which the ear is not closed) earphone is not limited to the earphone having the ring shape as illustrated in FIG. 1. The open-ear type earphone may include an ear-cuff shaped earphone to be worn in a manner such that it is hooked on the ear or it is clipped around the rim of the ear. Alternatively, a bone conduction earphone may be used. The bone conduction earphone may include an ear-cuff type or a clip type. Alternatively, the bone conduction earphone may be worn in the vicinity of the ear (around the base of the ear or below the temple.) In addition, in a case of an earphone being not of the open-ear type but having, for example, a noise-cancelling function (an earphone with a microphone), collected surrounding sounds are appropriately combined with the sound of the word-of-mouth information, and are played to present the word-of-mouth information together with the surrounding sounds. This also allows the user to feel as if someone were actually whispering the word-of-mouth information around the user as described above.

Background

Here, an existing method of presenting the word-of-mouth information is performed on a text basis, and a user has been required to perform input operation of text such as a search keyword in order to search for the word-of-mouth information that the user wishes to know. Hence, the word-of-mouth information has not been able to be received directly in a simple manner. In addition, touching manipulation of, for example, a smartphone or screen UI is not suited to use when doing something else.

Furthermore, in the case of the existing presentation of the word-of-mouth information, the word-of-mouth information is presented in response to an intentional demand made by a user. Hence, any latent demand, of which the user is not conscious, has not been taken into consideration.

Therefore, the information processing system according to the present embodiment estimates the user's latent demand in real time on the basis of a user condition (an action, a location, time, a plan, a vital sign, a body motion, or the like), performs matching of word-of-mouth information having a high degree of demand, and audibly presents it. The word-of-mouth information that is audibly presented includes, for example, word-of-mouth information (specifically, word-of-mouth information associated with the location) submitted by another user in a region around the user.

This enables the user to obtain information that the user needs but has been unable to acquire, on the basis of the user's condition of which the user is usually unconscious. The word-of-mouth information to be presented may be able to include accurate information sophisticated by a review system and accumulated so as to be associated mainly with a location such as an urban area, a tourist spot, or an event space.

Furthermore, at the time of presenting the word-of-mouth information, the word-of-mouth information is casually provided using, for example, a sense of hearing or other sensory channels in a manner that does not excessively attract the user's attention. This makes it possible to alleviate awkwardness or irksomeness that the user feels against word-of-mouth information being presented automatically in a state where the user does not clearly demand information.

More specifically, when the user walks while wearing the above-described client terminal 1 as illustrated, for example, in FIG. 1, the information processing system according to the present embodiment continuously (or periodically) estimates a latent demand in real time on the basis of user condition. Then, information corresponding to the estimated latent demand such as word-of-mouth information regarding a restroom ("the restroom here was very clean" or the like) is presented at a volume level to be so adjusted as if people around the user were whispering. Alternatively, the information processing system plays a sound that reminds the user of existence of a restroom (a music typically heard in restrooms, a sound of water at the time of flushing, or the like). This reminds the user of dropping by a restroom, and gives the user a feeling that the user notices it by him/herself. This makes it possible to casually present word-of-mouth information that is highly valuable for the user, although it has not been highly valued by the user intentionally.

Furthermore, the information processing system according to the present embodiment may register the word-of-mouth information through a sound. A person to register the word-of-mouth information is able to register the word-of-mouth information while having a feeling that he or she whispers what he or she currently feels.

It should be noted that, in the present description, in addition to reviews on products, restaurants, facilities, or the like, the "word-of-mouth information" broadly encompasses a rumor, a murmur, what one thinks, a thought, information regarding what has happened, useful information, tourist information, event information, and information submitted by people.

Figure 2:
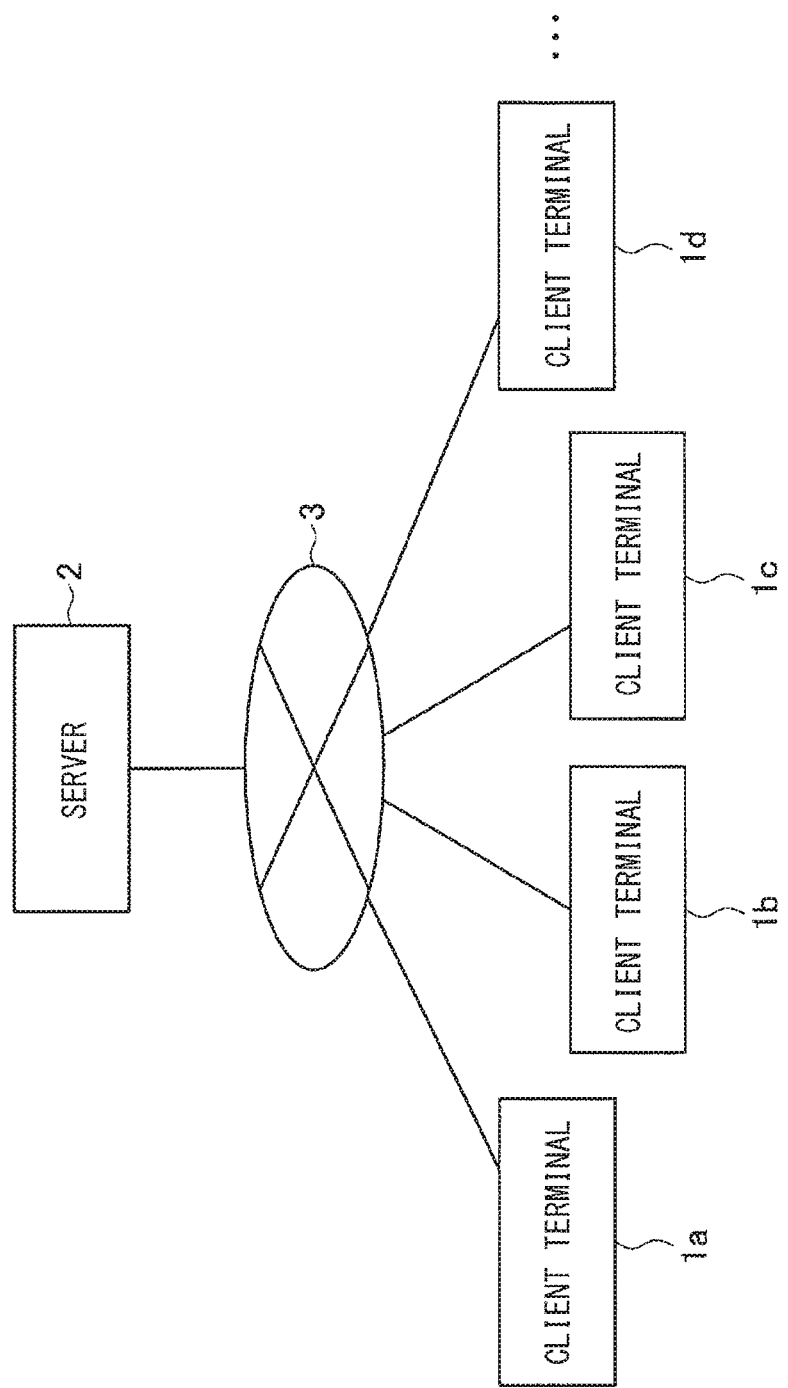
FIG. 2 is a diagram illustrating an example of a general configuration of an information processing system according to the present embodiment.

Next, a general configuration of such an information processing system according to the present embodiment will be described with reference to FIG. 2. FIG. 2 is a diagram illustrating one example of the general configuration of the information processing system according to the present embodiment.

As illustrated in FIG. 2, the information processing system according to the present embodiment includes the client terminals 1 (1a to 1d . . . ) that individual users wear, and a server 2. The client terminals 1 and the server 2 are communicatively coupled via a network 3 to perform sending and receiving of data with each other.

The client terminal 1 is able to audibly present the word-of-mouth information to the user as described above. Furthermore, the client terminal 1 is able to send positional information to the server 2 to make a request to distribute the word-of-mouth information, and to acquire the word-of-mouth information submitted in the region around the user. In addition, the client terminal 1 is also able to send (upload) the word-of-mouth information in conjunction with positional information to the server 2 to register the word-of-mouth information.

The server 2 registers the positional information and the word-of-mouth information, which have been sent from the client terminal 1, into a database. In addition, the server 2 is able to distribute the word-of-mouth information sent from the surrounding of the current location of the user, in response to the request from the client terminal 1.

Description of the information processing system according to one embodiment of the present disclosure has been given above. Next, a specific configuration of each device included in the information processing system according to the present embodiment will be described with reference to the drawings.

2. Configuration 2-1. Configuration of Client Terminal 1

Figure 3:
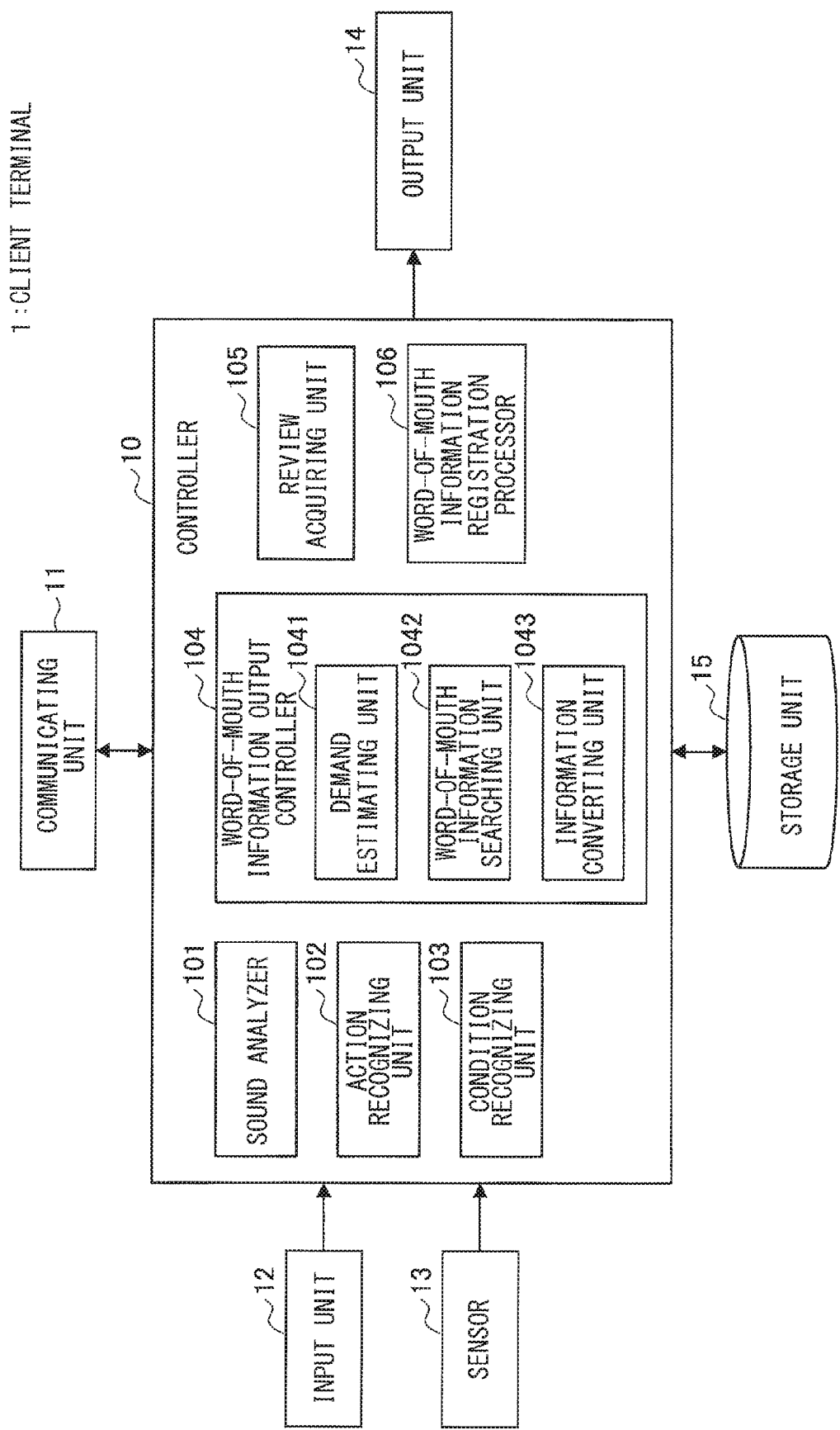
FIG. 3 is a block diagram illustrating an example of a configuration of a client terminal according to the present embodiment.

FIG. 3 is a block diagram illustrating one example of the configuration of the client terminal 1 according to the present embodiment. As illustrated in FIG. 3, the client terminal 1 includes a controller 10, a communicating unit 11, an input unit 12, a sensor 13, an output unit 14, and a storage unit 15.

Controller 10

The controller 10 functions as an operation processing device and a control device, and controls general operation in the client terminal 1 in accordance with various types of programs. The controller 10 is achieved, for example, with an electronic circuit such as a CPU (Central Processing Unit) or a microprocessor. In addition, the controller 10 may include a ROM (Read Only Memory) that holds, for example, a program and an operating parameter to be used, and a RAM (Random Access Memory) that temporarily holds, for example, a parameter that varies according to circumstances.

Furthermore, the controller 10 according to the present embodiment also functions as a sound analyzer 101, an action recognizing unit 102, a condition recognizing unit 103, a word-of-mouth information output controller 104, a review acquiring unit 105, and a word-of-mouth information registration processor 106.

Sound Analyzer 101

The sound analyzer 101 analyzes sound information (the user's utterance, another user's utterance, an ambient sound, or the like) inputted by the input unit 12. For example, the sound analyzer 101 recognizes the speech sound and makes it into text to perform morphological analysis, semantic analysis, and the like of the text (character string.) In addition, the sound analyzer 101 is also able to extract a feature of a voice from a result of analysis of the speech sound and compares the feature with the user's sound feature registered in advance to perform voice-print authentication. Furthermore, the sound analyzer 101 is able to analyze the ambient sound to recognize the circumstances around the user.

Action Recognizing Unit 102

The action recognizing unit 102 recognizes actions (walking, running, stopping, moving by bicycle, moving by train, gazing, or the like) of a user on the basis of various types of sensor information (positional information, motion information, biological information, or the like) detected by the sensor 13, various types of information (sound information, captured image information, or the like) inputted through the input unit 12, etc.

Condition Recognizing Unit 103

The condition recognizing unit 103 recognizes the user condition (an aim of an action, a location, a state of body such as tired, hungry, or thirsty, a plan, a body motion, surrounding circumstances, or the like) on the basis of various types of sensor information (positional information, motion information, biological information, or the like) detected by the sensor 13, various types of information (sound information, captured image information, or the like) inputted through the input unit 12, schedule information, or the like.

Word-of-mouth Information Output Controller 104

The word-of-mouth information output controller 104 performs control so as to present (output) the word-of-mouth information acquired from the server 2 to the user such as the output input 14. Specifically, the word-of-mouth information output controller 104 also functions as a demand estimating unit 1041, a word-of-mouth information searching unit 1042, and an information converting unit 1043.

The demand estimating unit 1041 estimates the user's latent demand according to the user condition. The user condition includes the user's action (which may also include high context such as during work, taking a break, during sightseeing, or during travel, and history of an action such as walking for a long period of time, running for a long period of time, a length of time of sleep, or the like), a location (a current location), a time (a current time), a plan (a future plan), a vital sign (that is, biological information), or a body motion (running, walking, or the like), and also includes environmental information (weather, a temperature, or the like), traffic information (delay or the like), and a congestion state (whether or not the surroundings are congested, or the like). In addition, the demand estimating unit 1041 may also be able to estimate the user's latent demand with reference to the user's preference, a user attribute (age, gender, home town, culture, or the like), an action pattern, or the like, in addition to the user condition described above.

More specifically, for example, the demand estimating unit 1041 estimates the user's latent demand of needing to go to the restroom (or anticipates an action in which the user goes to the restroom in near future), for example, in a case where the user is now walking in a facility such as a department store and is expected after this to travel for a long period of time on a train, in a case where the number of time the user goes to a restroom is smaller than usual, in a case where the need to urinate is anticipated on the basis of the biological information (information from a sensor of excretion prediction or the like), or the like, on the basis of the user's biological information, action, plan, location, or the like.

As another example, for example, the demand estimating unit 1041 is also able to estimate that there is a latent demand of wishing to drink something in a case where thirst is detected on the basis of the biological information (for example, sensor information regarding a blood sugar level or the like), or may estimate that there is a latent demand of wishing to have a meal in a case of detecting a hungry state on the basis of the biological information (for example, the sensor information regarding the blood sugar level or the like) or sound information (a sound of stomach growling.)

Furthermore, for example, the demand estimating unit 1041 may estimate a latent demand of wishing to have a break in a case where tiredness is detected on the basis of the biological information (for example, sweat, a pulse, or the like), the history of action, the environmental information (for example, a temperature), or the like.

In addition, for example, the demand estimating unit 1041 estimates that entertainment information is desired in a case where the user is bored or seems to have a dull time, in a case where the user got tired or is under a lot of stress, or in a case where the user is depressed, or the like on the basis of the user's action, the biological information (for example, heartbeat, respiratory, or the amount of sweat), or the like.

Moreover, for example, the demand estimating unit 1041 may estimate that there is a demand of wishing to drop by a convenience store, a shop, a restaurant, a gas station, or the like in a case where there is no convenience store, shop, restaurant, gas station, or the like on the user's way after this, on the basis of the user's action, plan, or the like.

The estimations of the latent demands described above are merely examples, and the present embodiment is not limited to these. In addition, there is no specific limitation as to the method of estimation. For example, estimation may be made in accordance with a predetermined rule, or an estimation model generated through machine learning may be used (in a case of machine learning, feedback may be possible as to whether or not the estimation is correct on the basis of the actual action of the user.)

The word-of-mouth information searching unit 1042 searches for appropriate (that is, solving the latent demand) word-of-mouth information corresponding to the latent demand estimated by the demand estimating unit 1041 to perform matching of appropriate word-of-mouth information that meets the demand. The word-of-mouth information that solves the latent demand is able to be decided, for example, on the basis of a keyword included in the word-of-mouth information, a result of semantic analysis of the word-of-mouth information, or the like.

In addition, the word-of-mouth information searching unit 1042 may search for the appropriate word-of-mouth information from word-of-mouth information submitted by another user in the region around the user, on the basis of information regarding the current position of the user detected by the sensor 13. The word-of-mouth information in the present embodiment is accumulated, for example, in the word-of-mouth information storage unit 22 of the server 2. The word-of-mouth information in the present embodiment is associated with the location at which the word-of-mouth information is submitted (that is, the positional information regarding a registering person at the time of registering (submitting) the word-of-mouth information.) This makes it possible to obtain a word of mouth associated with a case where the amount of word-of-mouth information varies according locations, or with individualities specific to the locations. For example, as various types of people use a restroom, it is possible to obtain various types of word-of-mouth information. In addition, chatting at a restroom or hot-water service room tends to warm up. Hence, more word-of-mouth information is conceived to be submitted. Furthermore, for example, at an amusement arcade, it is possible to obtain word-of-mouth information submitted by those who visit the amusement arcade. For example, at a department store, it is possible to obtain word-of-mouth information submitted by those who visit the department store.

Furthermore, the word-of-mouth information searching unit 1042 may search the most recent word-of-mouth information (for example, within a predetermined period of time.) The word-of-mouth information in the present embodiment is associated with the registered (submitted) time. This makes it possible to search for newer word-of-mouth information.

Furthermore, the word-of-mouth information searching unit 1042 is also able to take into consideration a user preference, plan information, a travel path, a travel direction, a user attribute (gender, age, race, cultural customs, or the like) or other factors in addition to the location, the time, or the other factors described above, and search for more appropriate word-of-mouth information.

Figure 4:
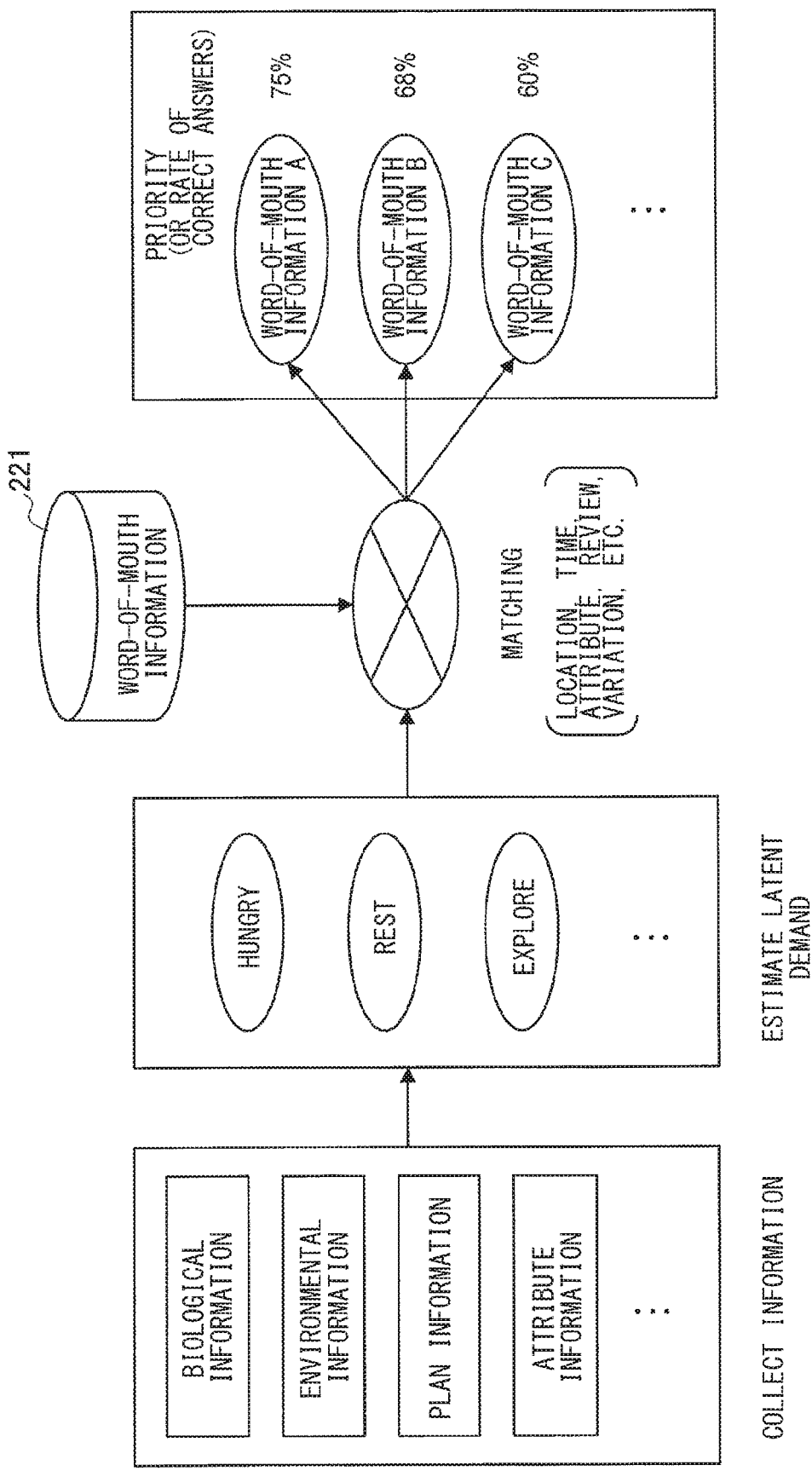
FIG. 4 is a conceptual diagram for describing matching of word-of-mouth information according to the present embodiment.

Here, a flow of matching of the word-of-mouth information according to the present embodiment will be described with reference to FIG. 4. FIG. 4 is a conceptual diagram for describing the matching of the word-of-mouth information according to the present embodiment. As illustrated in FIG. 4, the present embodiment first collects the user's information such as the biological information, the environmental information, the plan information, the attribute information, or the like. Then, the present embodiment estimates the user's latent demand (for example, "hungry," "rest," "explore," or the like) on the basis of the collected information to perform matching of word-of-mouth information 221 on the basis of a result of the estimation of the demand. At the time of matching, the present embodiment looks up factors such as a location, a time, an attribute, a review, variation, or the like. In other words, matching may be performed of word-of-mouth information fitting the attribute of the user and having a higher rating from among, for example, pieces of word-of-mouth information submitted within the latest 30 minutes in the region around the user. Note that a priority (or a rate of correct answers) may be set (calculated) for each piece of word-of-mouth information for which matching has been performed, and the word-of-mouth information may be presented to the user in the order from word-of-mouth information having a higher priority (or higher rate of correct answers.) The priority may be calculated, for example, on the basis of each of the factors used at the time of performing matching, and may be set, for example, such that the priority increases as the position is closer to the user, the information is newer, the information more fits the user's preference, and the information has a higher review. In addition, the rate of correct answers may be calculated on the basis of a possibility of solving the latent demand.

Next, several specific examples of searching for (performing matching of) the word-of-mouth information according to the present embodiment will be described.

For example, in response to a latent demand of wishing to go to the restroom, the word-of-mouth information searching unit 1042 searches for word-of-mouth information relating to a restroom and submitted by another user in the region around the user. This makes it possible, for example, to search for useful information concerning a restroom such as "the restroom here was spacious and comfortable," "the restroom was clean," "the restroom on the third floor was available," or "there was a selfie area in the restroom on the second floor." In addition, the word-of-mouth information searching unit 1042 is also able to search for word-of-mouth information concerning a restroom more suitable for the user, further on the basis of the user preference, the user's physical limitation (sick or the like), the user attribute (gender, age, cultural custom, or the like), or the like. For example, in a case where the user is a female, and likes cute items or stylish locations, it is possible to search for word-of-mouth information concerning a cute restroom with designed interior or the like in the region around the user. In addition, in a case where the user is a traveler coming from overseas, and the way to use a restroom differs from the user's country, word-of-mouth information concerning the way to use a restroom submitted by someone from the same country may be preferentially searched for (for example, free from constraints of the location.)

Furthermore, in a case where the latent demand is "hungry," the word-of-mouth information searching unit 1042 may search for, for example, word-of-mouth information concerning a Chinese restaurant located near the user's travel path on the basis of a job schedule after this, the travel path, the user's taste, and the like.

In addition, in a case where the latent demand is "entertainment," the word-of-mouth information searching unit 1042 may search for word-of-mouth information having a review rated higher by the same generation and the same gender as the user from among pieces of word-of-mouth information concerning events that allows for making a change (an entertainment event, a movie, a theater, a recreational facility, a theme park, or the like), for example, on the basis of a plan for holiday, the user preference, or the like. At this time, the constraints of the location may be eliminated or a region of the location may be extended to a range where the user acts, to perform the searching.

Specific description has been given above of searching for (matching of) the word-of-mouth information.

The information converting unit 1043 has a function of converting the word-of-mouth information to be presented to the user, into appropriate one. For example, the information converting unit 1043 converts the word-of-mouth information so that the word-of-mouth information is able to be presented in a more natural and casual manner that does not distract the user. For example, the volume level of the word-of-mouth information may be reduced so as to be heard as if someone were whispering around the user. Further, the ambient sound may be mixed therewith. Alternatively, the word-of-mouth information may be converted into a sound (a music, a melody, a crying sound, a noise, or the like) associated with contents of the word of mouth. Furthermore, in a case of an open earphone as described with reference to FIG. 1, an actual ambient sound is heard. Hence, the information conversion as used in the present description also includes simply controlling the volume level of the word-of-mouth information so as to be lower than a predetermined value. Moreover, on the basis of positional information associated with the word-of-mouth information, the positional information regarding the user, and the direction of the user, sound localization processing may be performed on the word-of-mouth information by a sound in a manner such that the word-of-mouth information is heard from a direction where the word-of-mouth information is submitted.

Furthermore, in addition to the sound (stimulation to the sense of hearing), the information converting unit 1043 may convert the word-of-mouth information into another sensory channel such as the sense of touch, the sense of smell, or the sense of sight. For example, in a case where the word-of-mouth information relates to a restroom, the information converting unit 1043 may convert it into information regarding a stimulus to stomach. In a case where the word-of-mouth information relates to food, the information converting unit 1043 may convert it into smell. In a case where the word-of-mouth information relates to entertainment, the information converting unit 1043 may convert it into light. In addition, the information converting unit 1043 may convert it into a plurality of sensory channels.

Furthermore, the information converting unit 1043 may convert the word-of-mouth information according to the attribute (home town, generation, culture, race, living environment, or the like) of the user as part of the method of presenting it without distracting the user. Examples thereof include translation into a language that the user uses, conversion into an expression or wordings that the user is familiar with (conversion into wordings that young people use, or the like), conversion into the standard language, conversion into an easy-to-understand expression (summarizing, replacement of wording, adding of related information such as explanation, or the like). Note that it may be configured to allow the user to set disabling/enabling of conversion as some may wish to listen in a dialect or unfamiliar wording on purpose. In addition, it is also possible to present the word-of-mouth information only to young people by converting the word-of-mouth information into a mosquito sound.

Here, FIG. 5 illustrates an example of a conversion table based on categories of the word-of-mouth information. The information converting unit 1043 can look up the conversion table in accordance with the category of the word-of-mouth information to be presented, to perform information conversion. The category of the word-of-mouth information includes, for example, "gourmet," "entame (abbreviation for entertainment)," "restroom," or the like as illustrated in FIG. 5. In addition, the conversion type includes language, dialect, related information, generation-specific expression, and the like. Referring to FIG. 5, for example, in a case of gourmet information, related information is added. In a case of entertainment information, language conversion or conversion into generation-specific expression is performed. In a case of restroom information, language conversion, dialect conversion, addition of related information, conversion into generation-specific expression are performed. Here, as one example, as the word-of-mouth information related to a restroom is to solve a physiological phenomenon and is significantly important, accurate understanding by the user is given a higher priority. Hence, conversion of language and expression, addition of related information, and the like are set to be performed. Note that the conversion table illustrated in FIG. 5 is merely one example, and the present embodiment is not limited to this.

Specific description has been given above of the word-of-mouth information output controller 104. Note that the word-of-mouth information to be presented is a sound recorded and submitted by another user. Hence, it may contain the ambient sound or other noises. The word-of-mouth information output controller 104 is also able to emphasize the voice of human to play it. In addition, the word-of-mouth information output controller 104 is also able to sense a specific noise or a steady sound to suppress the volume level in the bandwidth thereof or amplify a desired sound or the like to emphasize a target sound (a human or ambient sound.) Furthermore, unlike display output using text, in a case where a plurality of pieces of word-of-mouth information is audibly presented at the time of audibly presenting the word-of-mouth information, these pieces of word-of-mouth information are required to be sequentially played in a certain range (section) in a direction of time. In a case where the user stays in a certain range, it is possible to have sufficient time to sequentially play a lot of pieces of word-of-mouth information. However, in a case where the user is moving, it is not possible to have such sufficient time, and it takes more time to sequentially play all of the lot of pieces of word-of-mouth information. Thus, the word-of-mouth information output controller 104 may play the predetermined number of pieces of word-of-mouth information in order from the higher rank in accordance with the priority (or the rate of correct answers) described above, or may mix (edit) the plurality of pieces of word-of-mouth information as appropriate to reduce the play period.

The review acquiring unit 105 acquires a user review of the word-of-mouth information that has been presented. For example, the review acquiring unit 105 acquires, from the sensor 13, an action (stop moving, turn around, pivot, whether or not the user actually takes action, destination after that, or the like) of the user after the word-of-mouth information is presented, and decides the level of review (calculates a review value.) In addition, the review acquiring unit 105 may perform weighting according to contents of the action to decide the level of review. Furthermore, the review acquiring unit 105 may decide the level of review on the basis of contents of an utterance (a positive utterance expressing interest, impression, or appreciation such as "what!", "yeah!," or "I didn't know that!," a negative utterance such as "already knew that," "annoying," or "not interesting", or the like) of the user for the presented word-of-mouth information. Moreover, the review acquiring unit 105 is also able to decide the level of review on the basis of a reaction of the user such as talking to a friend about contents of the word-of-mouth information (repeating), heated conversation with a friend about the contents of the word-of-mouth information (developing), and conversation in which a keyword of the word-of-mouth information is said plural times.

Figure 6:
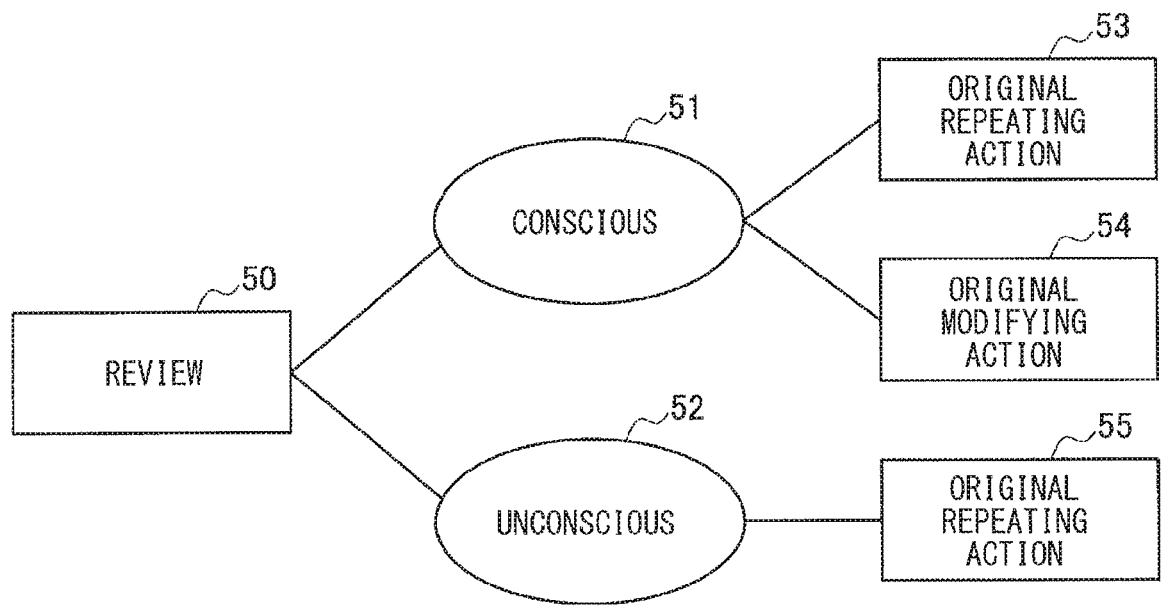
FIG. 6 is a schematic diagram for describing categories of review according to the present embodiment.

Here, the categories of review will be described with reference to FIG. 6. FIG. 6 is a schematic diagram for describing the categories of review according to the present embodiment. As illustrated in FIG. 6, a review 50 done by a user includes a conscious review 51 and an unconscious review 52. The conscious review 51 is supposed to include an original repeating action 53 and an original modifying action 54. The original repeating action 53 is supposed to include an explicit action for a positive review including a button operation, a predetermined comment ("Good" or the like), a predetermined gesture (thumb-up gesture or the like), and the like. The number of button operations or the number of predetermined comments is used as the number of repeats, and the level of review can be decided on the basis of the number of repeats. Further, the original modifying action 54 is supposed to enhance the original word-of-mouth information (supplement, addition, and elaboration for details), or develop the original word-of-mouth information (application to another spot or scene, or development of "location".) In this case, the original word-of-mouth information that is to be modified is reviewed. At the same time, contents of modification can also be registered as the word-of-mouth information.

In contrast, the unconscious review 52 includes an original repeating action 55. The original repeating action 55 is supposed to include an unconscious utterance ("oops," "what!," or the like), an unconscious gesture, or a movement.

Word-of-mouth Information Registration Processor
106

The word-of-mouth information registration processor 106 performs a process of registering the word-of-mouth information in the server 2. The word-of-mouth information registration processor 106 sends sound data inputted from the sound inputting unit 16 to the server 2 as the word-of-mouth information to perform the registering process. The user is able to easily register the word-of-mouth information anytime and anywhere immediately only by whispering. In addition, the word-of-mouth information registration processor 106 sends, together with the word-of-mouth information, information regarding the current position measured by a position measuring unit. Furthermore, the word-of-mouth information registration processor 106 may also send surrounding circumstances (a congestion state, presence or absence of a person in the region around the user, or the like) recognized by the condition recognizing unit 103, environmental information (a temperature, weather, or the like) detected by an environment sensor (not illustrated), and a user attribute (ID, age, gender, taste, or the like of a person who submits the word-of-mouth information.)

Collection of the sound of the word-of-mouth information starts when the user performs an intentional operation such as depressing a button disposed on the client terminal 1, makes a sound command ("word of mouth" or the like) using a predetermined keyword, or performs a specific gesture (placing a hand on the mouth). The word-of-mouth information registration processor 106 causes the sound inputting unit 16 to collect (record) the sound for a predetermined period of time (for example, for 10 seconds or the like) after the above-described action (hereinafter, also referred to as a "registration starting trigger") is taken, or the utterance of one phrase, and acquires it as the word-ofmouth information. In addition, in a case where the registration starting triggers are consecutively performed, a sound collection (recording) period may be extended.

Furthermore, recording of the word-of-mouth sound is not limited to the method that is performed in the case where the intentional action is taken. The client terminal 1 may be always fixed to a word-of-mouth submitting mode. In this case, the word-of-mouth information registration processor 106 automatically discriminates and extracts a word-of-mouth sound portion on the basis of a result of the analysis, by the sound analyzer 101, of a speech sound collected by the input unit 12, to acquire the word-of-mouth information.

Furthermore, the word-of-mouth information registration processor 106 is also able to supplement the collected sound on the basis of the user's action or surrounding circumstances, and then, send it to the server 2 as the word-of-mouth information. For example, in a case where the sound includes a demonstrative word, or a subject or an object is omitted, which includes "this is delicious," "a music event seems to start at this place," "this shop provides high cost performance" and the like, it may not be clear as to what the word-of-mouth information relates to in some cases. Therefore, object recognition based on a captured image taken by a camera serving as one example of the input unit 12, or location information (location ID) identified by the condition recognizing unit 103 on the basis of information regarding the current position measured by the position measuring unit serving as one example of the sensor 13 may be used to supplement it.

Communicating Unit 11

The communicating unit 11 is coupled to the network 3 in a wired or wireless manner to perform sending and receiving of data with the server 2 on the network. The communicating unit 11 is communicatively coupled to the network 3, for example, through wired/wireless LAN (Local Area Network), Wi-Fi (registered trademark), a mobile communication network (LTE (Long Term Evolution), 3G (the third-generation mobile communication system)), or the like.

Input Unit 12

The input unit 12 acquires various types of input information inputted to the client terminal 1, and outputs them to the controller 10. For example, the input unit 12 may include at least any one of the operation inputting unit, the sound inputting unit, or the camera.

The operation inputting unit receives an operational instruction given by the user, and outputs contents of the operation to the controller 10. The operation inputting unit may be a touch sensor, a pressure sensor, or a proximity sensor. Alternatively, the operation inputting unit may be a button, a switch, a lever, or other physical configurations.

The sound inputting unit is achieved with a microphone, a microphone amplifier that performs an amplifying process on a sound signal obtained by the microphone, and an A/D converter that digitally converts the sound signal, and outputs the sound signal to the controller 10. In addition, the sound inputting unit is able to perform directional or non-directional beam generation using a plurality of microphones to dynamically separate the user's utterance, another user's utterance (someone whom the user is talking to in person), and the surrounding ambient sound to collect sounds.

The camera includes, for example: a lens system including an imaging lens, an aperture, a zoom lens, a focus lens, or the like; a drive system that causes the lens system to perform focusing operation and zooming operation; and a solid-state imaging device array that performs photoelectric conversion of imaging light obtained in the lens system to generate an imaging signal. The solid-state imaging device array may be achieved, for example, with a CCD (Charge Coupled Device) sensor array or a CMOS (Complementary Metal Oxide Semiconductor) sensor array. In addition, the camera according to the present embodiment may be provided at a left or right tip end of the main body portion 110 in a manner such that a range to be shot includes at least a forward direction of the user when the user wears the client terminal 1 as illustrated in FIG. 1. Furthermore, the camera may be movable, and is able to be directed in a vertical direction or in a horizontal direction in accordance with a sound instruction given by the user. Furthermore, the camera is able to automatically rotate so as to keep a horizontal posture in accordance with a result of detection by a motion sensor.

Sensor 13

The sensor 13 is achieved with various types of sensor devices that are able to detect the user condition. For example, the sensor 13 is supposed to include a position measuring unit, a motion sensor, a biosensor, an environment sensor, and the like. The sensor 13 may be provided separately from the client terminal 1, and be disposed on each portion (shoulder, arm, waist, foot, or the like) of the body or clothes of the user or the like.

The position measuring unit has a function of detecting the current position of the client terminal 1 on the basis of a signal acquired from outside. Specifically, for example, the position measuring unit is achieved with a GPS (Global Positioning System) measuring unit, and receives radio waves from GPS satellites to detect a position where the client terminal 1 exists to output the detected positional information to the controller 10. Furthermore, in addition to the GPS, the position measuring unit may be a unit that detects the position by means of, for example, Wi-Fi (registered trademark), Bluetooth (registered trademark), sending and receiving information with a mobile phone, a PHS, a smartphone, or the like, near-field communication, or the like.

The motion sensor is a detecting unit that detects a motion of the. The motion sensor is achieved, for example, with an acceleration sensor, a gyro sensor, a magnetic field sensor, or the like.

The biosensor is a sensing unit that senses biological information regarding the user. The biosensor is achieved, for example, with a body temperature sensor, a vein sensor, a pulse sensor, a heartbeat sensor, a respiratory sensor, a sweat sensor, a brain wave sensor, an excretion predicting sensor, a blood-sugar level sensor, or the like. The biosensor may be disposed at a position that is in contact with (or is close to) the body of a user when the user wears the client terminal 1, for example, as illustrated in FIG. 1, and may detect the biological information regarding the user when the user wears it.

The environment sensor is achieved with a temperature sensor, a humidity sensor, a rain sensor, a wind sensor, an illumination sensor, a barometric sensor, or the like.

Output Unit 14

The output unit 14 presents the word-of-mouth information in accordance with the control by the controller 10. For example, the output unit 14 can be achieved with a sound output unit, a display unit, a vibration unit, a light emission unit, a smell generating unit, or the like.

Storage Unit 15

The storage unit 15 is achieved with a ROM (Read Only Memory) that holds, for example, a program and an operating parameter to be used by the controller 10 for processing, and a RAM (Random Access Memory) that temporarily holds, for example, a parameter that varies according to circumstances.

Specific description has been given above of the configuration of the client terminal 1 according to the present embodiment. Note that the configuration of the client terminal 1 is not limited to the example illustrated in FIG. 3. For example, at least a portion of the configuration of the client terminal 1 may be disposed in an external device. At least a portion of each function of the controller 10 may be achieved with the server 2 or an information processing terminal (a so-called edge server or the like) of which communication distance is relatively close to that of the client terminal 1. For example, a configuration may be employed in which at least any of the sound analyzer 101, the action recognizing unit 102, the condition recognizing unit 103, the word-of-mouth information output controller 104, or the review acquiring unit 105 is achieved with the server 2 or an information processing terminal having a communication distance closer to the client terminal 1 than the server 2. As described above, with the configurations of the client terminal 1 being distributed as appropriate, it is possible to improve a real-time performance or reduce a processing load.

2-2. Configuration of Server 2

Figure 7:
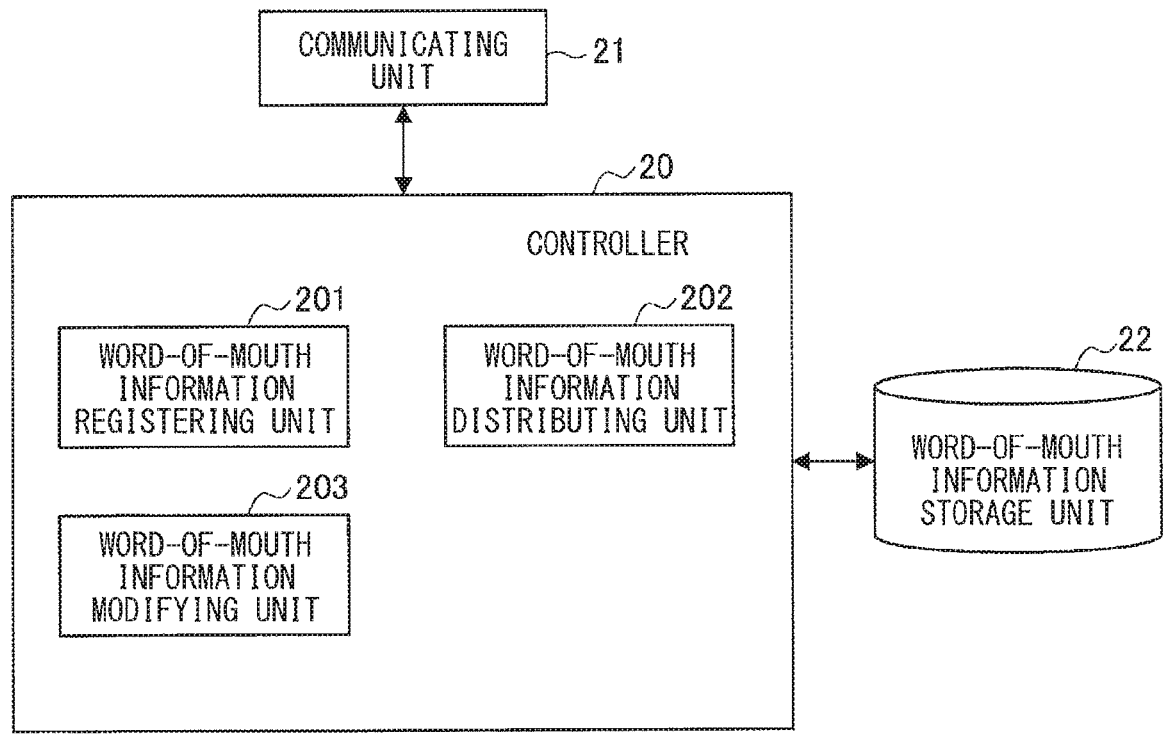
FIG. 7 is a block diagram illustrating an example of a configuration of a server according to the present embodiment.

FIG. 7 is a block diagram illustrating one example of the configuration of the server 2 according to the present embodiment. As illustrated in FIG. 7, the server 2 includes a controller 20, a communicating unit 21, and a word-of-mouth information storage unit 22.

Controller 20

The controller 20 functions as a computation processing device and a control device. The controller 20 controls general operation in the server 2 in accordance with various types of programs. The controller 20 is achieved, for example, with an electronic circuit such as a CPU (Central Processing Unit) or a microprocessor. In addition, the controller 20 may include a ROM (Read Only Memory) that holds, for example, a program and a computation parameter to be used, and a RAM (Random Access Memory) that temporarily holds, for example, a parameter that varies according to circumstances.

In addition, the controller 20 according to the present embodiment also functions as a word-of-mouth information registering unit 201, a word-of-mouth information distributing unit 202, and a word-of-mouth information modifying unit 203.

The word-of-mouth information registering unit 201 stores, in the word-of-mouth information storage unit 22, the word-of-mouth information sent from the client terminal 1 together with positional information regarding the client terminal 1, date and time (submission date and time), and the user attribute (ID, age, gender, taste, or the like of a submitter.) In addition, the word-of-mouth information registering unit 201 may analyze contents of the word-of-mouth information to be associated with a category (classification) or a keyword of the word-of-mouth information. Furthermore, in a case where surrounding circumstances or environmental circumstances are also sent from the client terminal 1, the word-of-mouth information registering unit 201 associates these circumstances to store them in the word-of-mouth information storage unit 22.

In response to a request from the client terminal 1, the word-of-mouth information distributing unit 202 performs control to look up the positional information regarding the client terminal 1 to extract, from the word-of-mouth information storage unit 22, word-of-mouth information submitted in the region around the user (for example, the radius of 300 m or the like) within a predetermined period (for example, within one hour or the like), and send it to the client terminal 1 that is the source of the request. The range of distance (location) or time can be set as appropriate.

The word-of-mouth information modifying unit 203 modifies the word-of-mouth information to be registered or distributed, as needed. For example, from the viewpoint of privacy protection, there is a possibility that, in a case where there is few people around the submitter and the word-of-mouth information registered through a sound is provided directly to the receiver, the submitter is identified. In this case, the word-of-mouth information modifying unit 203 is able to perform the privacy protection in response to a request from the submitter or in accordance with the congestion state in a region around the submitter. Specifically, for example, the word-of-mouth information modifying unit 203 changes a tone of a voice to avoid personal identification through the voice, or averages the word-of-mouth information using similar word-of-mouth information, or combines the word-of-mouth information with similar word-of-mouth information. Note that, in a case where identification is highly likely even with some modification, for example, in a case where submission is made by only one person and there is only one receiver, the controller 20 is also able to stop distributing this word-of-mouth information.

Furthermore, the controller 20 can associate a result of the review sent by the client terminal 1 with the target word-of-mouth information to store them in the word-of-mouth information storage unit 22.

Communicating Unit 21

The communicating unit 21 is coupled to the network 3 in a wired or wireless manner. The communicating unit 21 performs sending and receiving of data with each client terminal 1 via the network 3. The communicating unit 21 is communicatively coupled to the network 3, for example, through a wired/wireless LAN (Local Area Network), Wi-Fi (Wireless Fidelity, registered trademark), or the like.

Word-of-mouth Information Storage Unit 22

The word-of-mouth information storage unit 22 holds word-of-mouth information sent from each client terminal 1. The word-of-mouth information can be associated with the user attribute (age, gender, taste, or the like), the information regarding location (positional information, a temperature, weather, a congestion state, or the like), information regarding time (GMT (Greenwich Mean Time), a specific event, or an event schedule), information regarding contents (a keyword, a category, or the like), or a review, and be stored. The information such as the specific event or the event schedule can be generated by the word-of-mouth information registering unit 201 such that the invent information is searched for on the network as needed, on the basis of the location where the word-of-mouth information is submitted, submission date and time, contents of the word-of-mouth information, and the like.

Furthermore, the word-of-mouth information storage unit 22 includes a storage device including, for example: a storage medium; a recording device that records data in the storage medium; a read-out device that reads out data from the storage medium; and a deleting device that deletes data recorded in the storage medium.

Specific description has been given of the configuration of the server 2 according to the present embodiment. Note that the configuration of the server 2 according to the present embodiment is not limited to the example illustrated in FIG. 7. For example, the server 2 may further have at least any one of the functions of the controller 10 of the client terminal 1 described with reference to FIG. 3.

3. Operating Processes

Next, operating processes of the information processing system according to the present embodiment will be specifically described with reference to the drawings.

3-1. Process of Presenting Word-of-mouth Information

Figure 8:
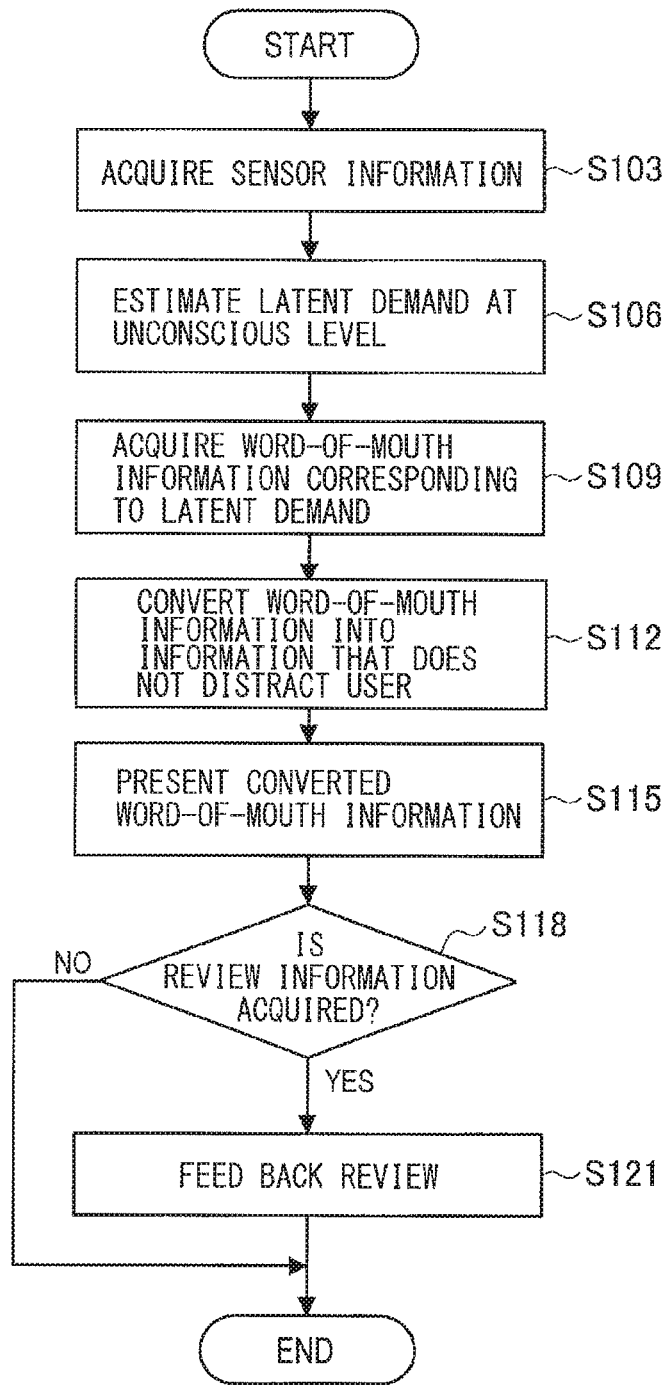
FIG. 8 is a flowchart illustrating a process of presenting the word-of-mouth information according to the present embodiment.

FIG. 8 is a flowchart illustrating a process of presenting the word-of-mouth information according to the present embodiment. As illustrated in FIG. 8, first, the client terminal 1 acquires the sensor information regarding the user condition from the sensor 13 (step S103), and causes the demand estimating unit 1041 to estimate a latent demand at an unconscious level (step S106.)

Next, the word-of-mouth information searching unit 1042 acquires the word-of-mouth information corresponding to the latent demand (step S109.)

Next, the information converting unit 1043 converts the acquired word-of-mouth information into information (in a state of being able to be casually presented) that does not distract the user (step S112).

Next, the word-of-mouth information output controller 104 presents the converted word-of-mouth information to the user from the output unit 14 (step S115.)

Thereafter, in a case where the review acquiring unit 105 acquires the user's review for the presented word-of-mouth information (step S118/Yes), the acquired review information is sent to the server 2 as a feedback on the word-of-mouth information (step S121).

Specific description has been given of the process of presenting the word-of-mouth information according to the present embodiment. Next, the information conversion described in step S112 above will be specifically described with reference to FIG. 9.

3-2. Information Converting Process

Figure 9:
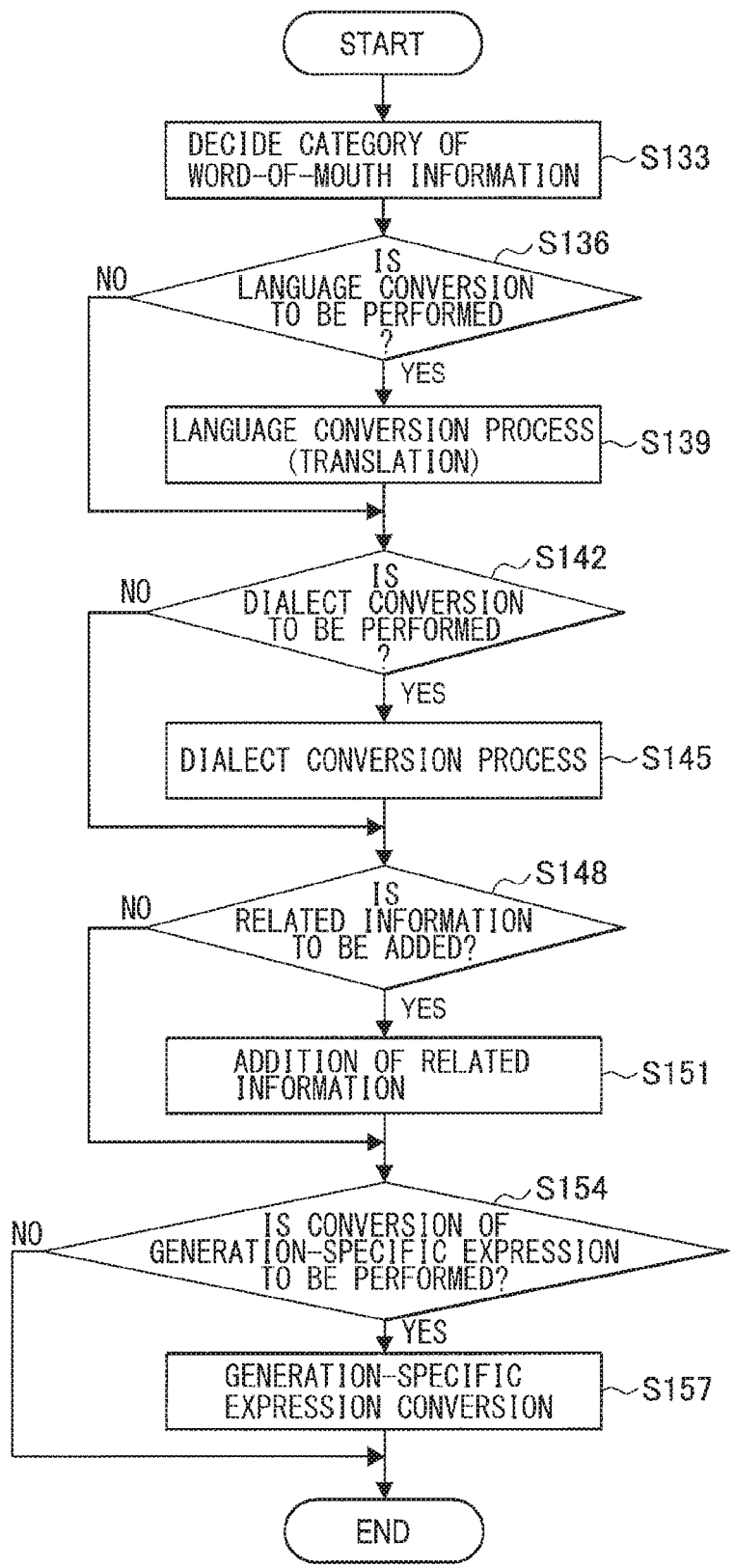
FIG. 9 is a flowchart illustrating an information converting process according to the present embodiment.

FIG. 9 is a flowchart illustrating an information converting process. As illustrated in FIG. 9, first, the information converting unit 1043 of the client terminal 1 decides the category of the word-of-mouth information (step S133), and looks up the conversion table illustrated in FIG. 5 on the basis of the decided category. In a case where the language is to be converted (step S136/Yes), a language converting process (translation) is performed (step S139.)

Next, the conversion table illustrated in FIG. 5 is looked up on the basis of the decided category. In a case where dialect is to be converted (step S142/Yes), a dialect converting process is performed (step S145).

Next, the conversion table illustrated in FIG. 5 is looked up on the basis of the decided category. In a case where related information is to be added (step S148/Yes), a related information process is performed (step S151.)

Next, the conversion table illustrated in FIG. 5 is looked up on the basis of the decided category. In a case where generation-specific expression is to be converted (step S154/Yes), a generation-specific expression converting process is performed (step S157.)

3-3. Reviewing Process

Therefore, acquisition of review information described in step S118 in FIG. 8 above will be specifically described with reference to FIG. 10.

Figure 10:
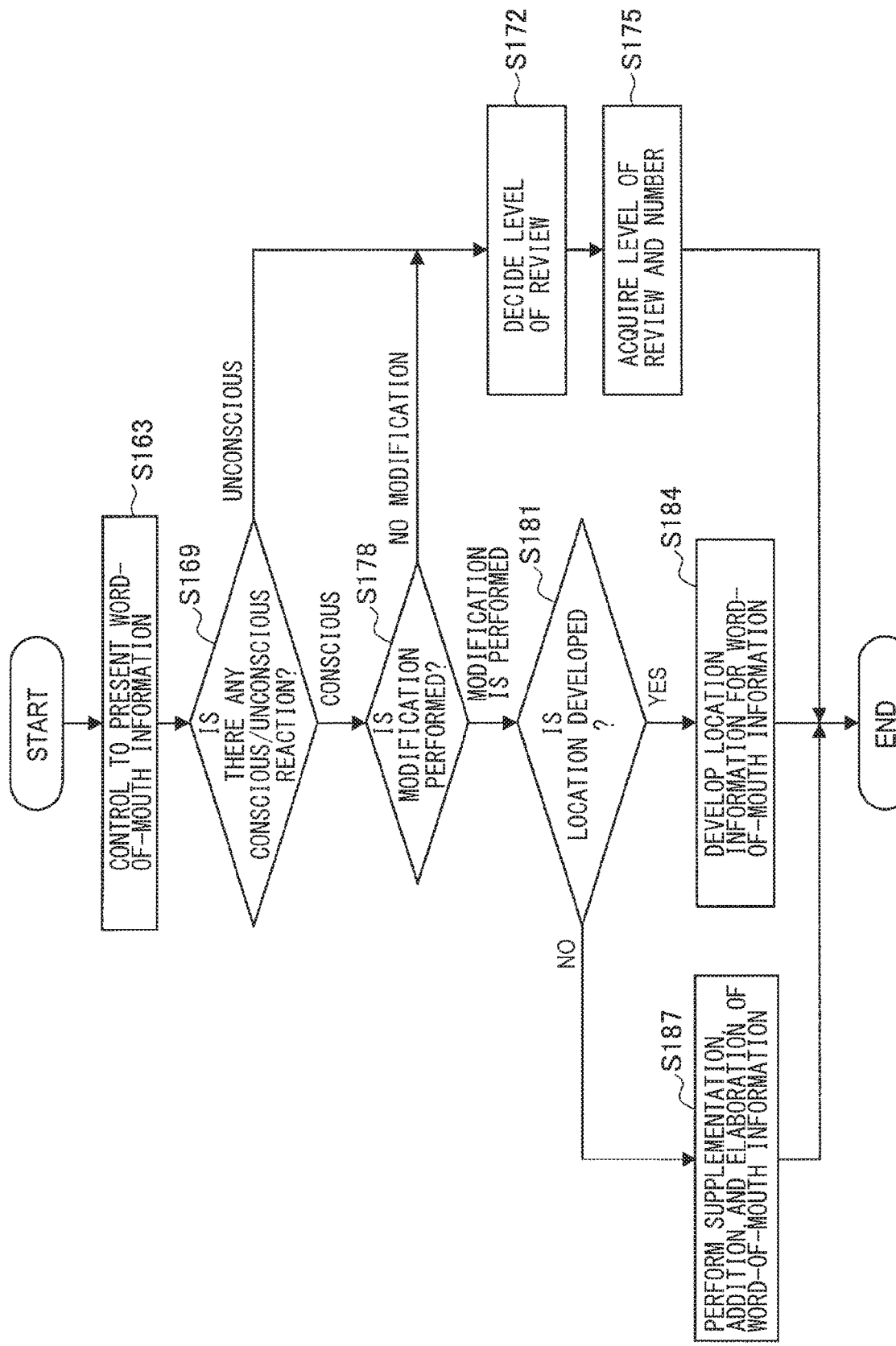
FIG. 10 is a flowchart illustrating a reviewing process according to the present embodiment.

FIG. 10 is a flowchart illustrating a reviewing process according to the present embodiment. As illustrated in FIG. 10, first, the controller 10 of the client terminal 1 causes the word-of-mouth information output controller 104 to perform control to present the word-of-mouth information (step S163.)

Next, the review acquiring unit 105 decides whether or not there is a conscious or unconscious reaction (step S169). The conscious or unconscious reaction can be acquired by the input unit 12 or the sensor 13.

Next, in a case where there is a conscious reaction, the review acquiring unit 105 decides whether or not to perform modification (step S178). The modification refers to original modification (enhancing or developing of the original word of mouth) described with reference to FIG. 6.

Next, in a case where the modification is performed, the review acquiring unit 105 decides whether or not the modification is to develop location (step S181.)

Next, in a case where the location development is made, the review acquiring unit 105 develops location information for the word-of-mouth information (step S184.) Specifically, as the word-of-mouth information is applicable to another location, the review acquiring unit 105 modifies positional information associated with the word-of-mouth information or generates word-of-mouth information associated with new location information, on the basis of the developed location.

In contrast, in a case where modification is performed but the modification is not to develop the location, the review acquiring unit 105 performs supplementation, addition, and elaboration (that is, correction of information other than the location information) on the word-of-mouth information on the basis of contents of the modification (step S187). Specifically, the review acquiring unit 105 generates new word-of-mouth information that has been corrected on the basis of the contents of the modification.

Thereafter, in a case where a reaction to the word-of-mouth information is the unconscious reaction, or in a case where the reaction is the conscious reaction and no modification is performed on the word-of-mouth information (original repeat), the review acquiring unit 105 decides the level of review on the basis of the conscious/unconscious reaction (step S172), and acquires the decided level of review and the number (here, the number of repeats) (step S175.)

As described above, the review acquiring unit 105 acquires, as review, word-of-mouth information for which supplement, addition, or elaboration has been done, wordof-mouth information for which development of location information has been done, the level of review, or the number of repeats. The review information as acquired above is sent to the server 2, and word-of-mouth information registered in the word-of-mouth information storage unit 22 is updated.

4. Others

Next, one example of presentation of the word-of-mouth information according to the present embodiment will be described in a supplemental manner.

4-1. Expression of Distribution of Word-of-mouth Information

The present embodiment is able to present the distribution or the attribute of the word-of-mouth information to the user in a manner that causes the user to feel it. The client terminal 1 uses a sound, smell, vibration, display, or the like to enable the user to feel the distribution or the attribute of the word-of-mouth information. Specific description will be given below.

In a case of visually showing the distribution or the attribute of the word-of-mouth information to the user, it is possible to present it using, for example, AR (Augmented Reality.) For example, in a case where the client terminal 1 is achieved with smart eyeglasses, it is possible to perform AR display in which the position, amount, type, and negative/positive of the word-of-mouth information is expressed in the user's view using a "colored cloud" (gray, pink, blue, fluffy, or the like.) Here, FIG. 11 illustrates an example in which the word-of-mouth information is presented with colored clouds using the AR display.

Figure 11:
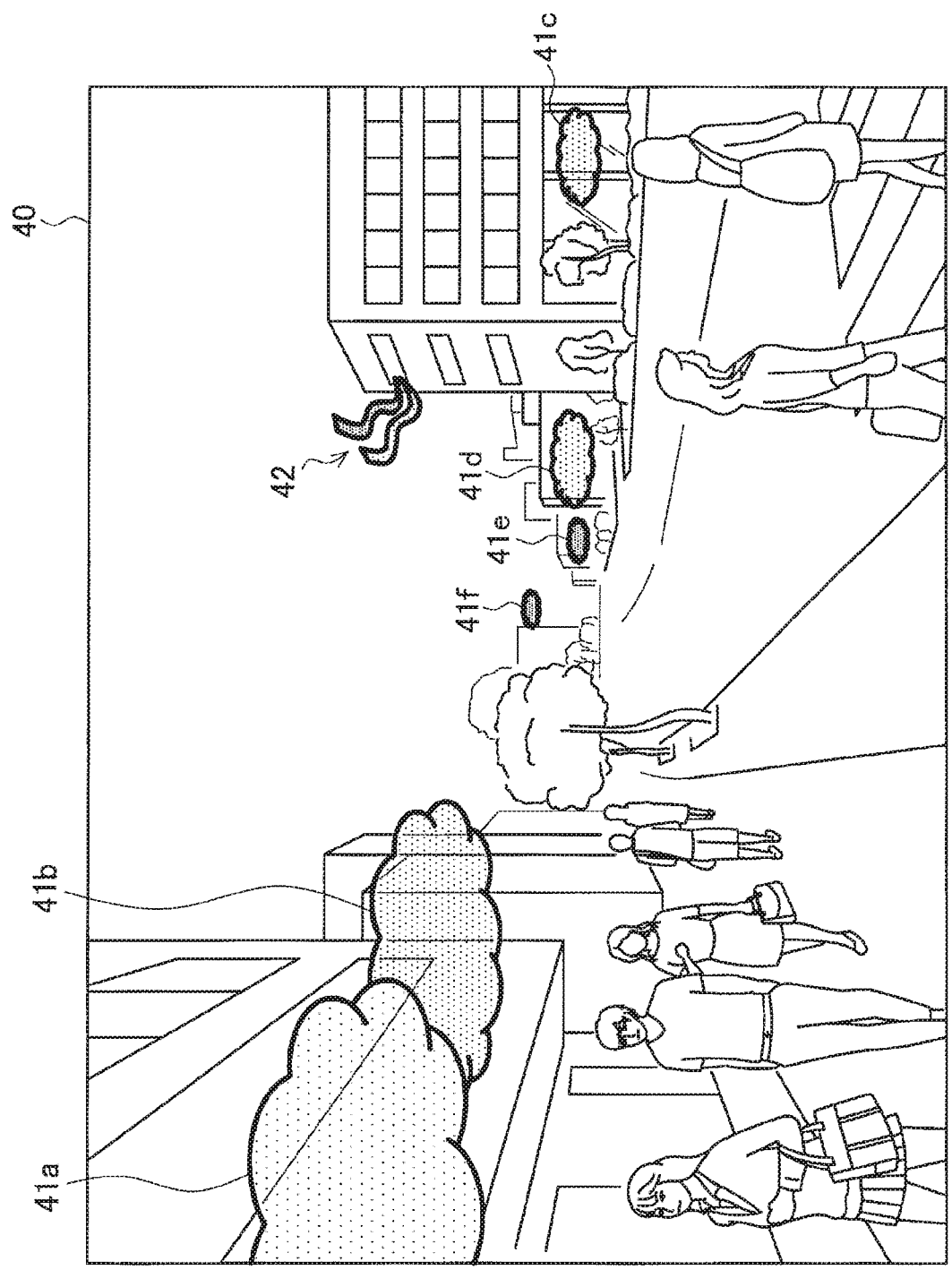
FIG. 11 is a diagram illustrating an example of presenting the word-of-mouth information using colored clouds according to the present embodiment.

A view 40 illustrated in FIG. 11 is a view obtained through a display (one example of the output unit 14, and a see-through type display provided at a lens portion disposed in front of eyes when worn by the user) of, for example, smart eyeglasses. In the view 40, a group of word-of-mouth information is displayed by means of the AR display as colored clouds. Colored clouds 41*a* to 41*f* include a lot of pieces of word-of-mouth information. The colored clouds 41*a* to 41*f* can be expressed using a color, a density, and a shape corresponding, for example, to the amount, or the negative/positive of the review or the contents. The shapes of the colored clouds 41*a* to 41*f* are merely examples. For example, a shape like smoke may be provided as with a colored cloud 42.

This makes it possible to intuitively grasp a location (a livening-up location or the like) where a lot of pieces of word-of-mouth information exists. In addition, the word-of-mouth information within the colored cloud may be audibly presented when the user gets close to the colored cloud, or a locked cloud may be heard only by a premium member or a specific user. In addition, the word-of-mouth information may be heard or may be stored by the user (virtually) bringing the user's dedicated microphone or smartphone or the user's hand into contact with the colored cloud.

Figure 12:
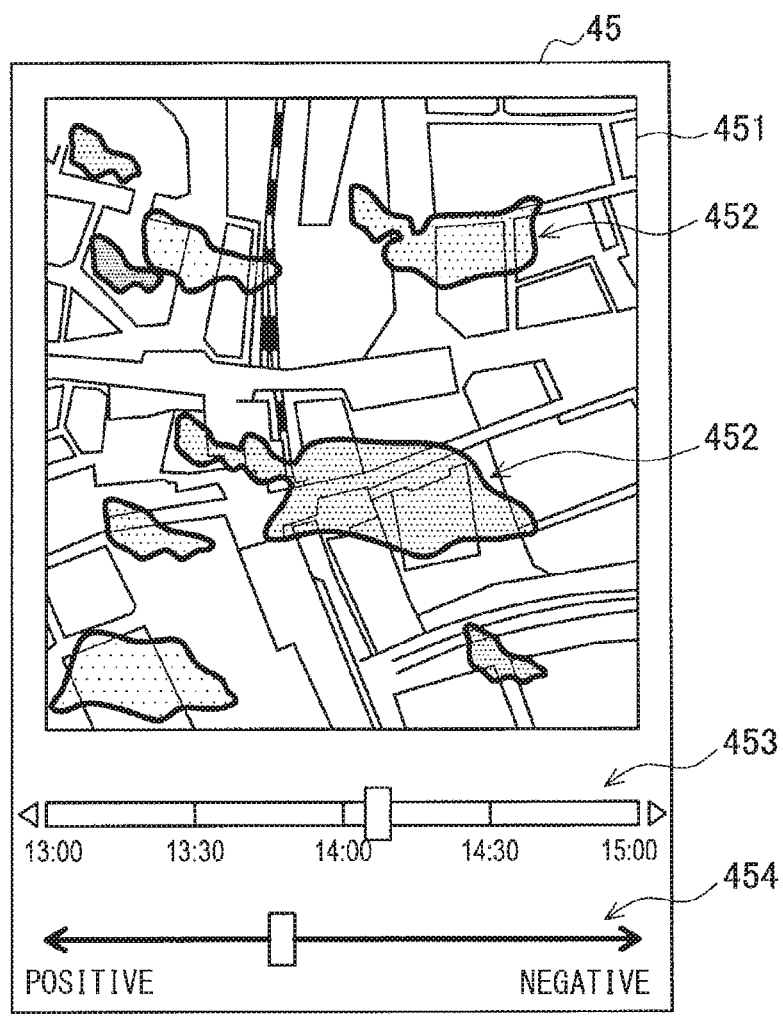
FIG. 12 is a diagram illustrating another example of presenting the word-of-mouth information using the colored clouds according to the present embodiment.

FIG. 12 is a diagram illustrating another example of presenting the word-of-mouth information using the colored cloud according to the present embodiment. In the example illustrated in FIG. 12, a map 451 is displayed, for example, on a screen 45 of a smartphone, and colored clouds 452 of the word-of-mouth information are displayed on the map like a weather radar. With a time operating axis 453 or a negative/positive operating axis 454 being operated, it is possible to observe the colored clouds of the word-of-mouth information at a given time (time when the word-of-mouth information is submitted) or colored clouds of the word-of-mouth information having given contents (negative or positive.)

Furthermore, as for presentation of the distribution of the word-of-mouth information through sound, it is possible to express the contents (dark, bright, or fun) of the word of mouth using a sound (a voice of a good mood, a cheering voice, applause, a crying sound, or the like), or present a strange sound, a sound of seagulls singing, or the like from a distance to express, through a sound, an atmosphere of the group of word-of-mouth information located far away.

4-2. Supplement

As another example of estimating a demand according to the present embodiment, in a case where a latent demand, for example, of wishing to help someone is estimated, SOS information such as "someone is in difficulty over there" may be presented.

Furthermore, in a case where the user sets a to-do list, word-of-mouth information that partially overlaps the to-do list set by the user may be casually presented to remind the user of the to-do list.

5. Conclusion

As described above, with the information processing system according to the embodiment of the present disclosure, it is possible to audibly present the word-of-mouth information to the user in accordance with the user's latent demand.

Detailed description of the preferred embodiments of the present disclosure has been given above with reference to the accompanied drawings. However, the present technology is not limited to these examples. It is apparent that those who have ordinary knowledge in the art of the present disclosure can reach the ideas of various modification examples or alteration examples within the technical ideas described in the scope of claims, and it is understood that these should naturally belong to the technical scope of the present disclosure.

For example, it is possible to create a computer program for causing hardware such as a CPU, a ROM, and a RAM built in the client terminal 1 or the server 2 described above to achieve functions of the client terminal 1 or the server 2. In addition, a computer-readable storage medium that holds the computer program is provided.

Furthermore, in the embodiment described above, the client terminal 1 is achieved with the neckband speaker illustrated in FIG. 1. However, the present embodiment is not limited to this. The client terminal 1 may be achieved with other wearable devices (smart eyeglasses, a smart earing, a smart headset, or the like.)

Furthermore, the effects described in the present description are merely given as explanation or examples, and are not given for the purpose of limitation. In other words, in addition to the effects described above or in place of the effects described above, the technology concerning the present disclosure can provide other effects that are apparent to those skilled in the art on the basis of the description of the present description.

It should be noted that it is possible for the present technology to have configurations described below.

(1)

An information processing device including a controller that performs control to estimate a latent demand on the basis of a current user condition, search for word-of-mouth information corresponding to the demand, and present the searched word-of-mouth information to a user.

(2) The information processing device according to (1) described above, in which the controller searches word-of-mouth information submitted by another user in a region around the user.

(3) The information processing device according to (1) or (2) described above, in which the controller performs control to convert the searched word-of-mouth information into a predetermined form and present it.

(4) The information processing device according to (3) described above, in which the controller makes a volume level of the word-of-mouth information lower than a predetermined value.

(5) The information processing device according to (4) described above, in which the controller causes an ambient sound to overlap the word-of-mouth information.

(6) The information processing device according to (3) described above, in which the controller converts the word-of-mouth information into vibration.

(7) The information processing device according to (3) described above, in which the controller converts the word-of-mouth information into smell.

(8) The information processing device according to (3) described above, in which the controller converts the word-of-mouth information into an associated melody.

(9) The information processing device according to any one of (1) to (5) described above, further including a sound output unit, in which the controller performs control to output the searched word-of-mouth information from the sound output unit through a sound.

(10) The information processing device according to any one of (1) to (9) described above, in which the controller recognizes the user condition at least on the basis of an action, a position, plan information, biological information, or environmental information regarding the user.

(11) The information processing device according to any one of (1) to (10) described above, in which, in addition to the latent demand, the controller at least takes into consideration an attribute, preference information, a history of action, or plan information regarding the user to search for the word-of-mouth information.

(12) The information processing device according to any one of (1) to (11) described above, in which the controller searches word-of-mouth information submitted, in a region around the user, by another user within a predetermined time period up to a current time.

(13) The information processing device according to any one of (1) to (12) described above, in which the controller acquires a review done by the user of the presented word-of-mouth information.

(14) The information processing device according to any one of (1) to (13) described above, in which the information processing device includes a neckband speaker.

(15) An information processing method including causing performing control, by a processor, to estimate a latent demand on the basis of a current user condition, search for word-of-mouth information corresponding to the demand, and present the searched word-of-mouth information to a user.

(16) A program that causes a computer to function as a controller that performs control to estimate a latent demand on the basis of a current user condition, search for word-of-mouth information corresponding to the demand, and present the searched word-of-mouth information to a user.

EXPLANATION OF REFERENCE NUMBERS 1 client terminal
2 server
3 network
10 controller
11 communicating unit
12 input unit
13 sensor
14 output unit
15 storage unit
20 controller
21 communicating unit
22 word-of-mouth information storage unit
101 sound analyzer
102 action recognizing unit
103 condition recognizing unit
104 word-of-mouth information output controller
105 review acquiring unit
106 word-of-mouth information registration processor
110 main body portion
120 earphone
201 word-of-mouth information registering unit
202 word-of-mouth information distributing unit
203 word-of-mouth information modifying unit
1041 demand estimating unit
1042 word-of-mouth information searching unit
1043 information converting unit

The invention claimed is:

1. An information processing device, comprising:
a Central Processing Unit (CPU) configured to:
control estimation of a latent demand of a first user based on a current user condition of the first user;
search word-of-mouth information based on the latent demand of the first user, wherein
the word-of-mouth information is output by a second user in a region within proximity of the first user, and
the second user is different from the first user;
convert the searched word-of-mouth information to a specific sound;
control a volume level of the specific sound to a specific value lower than a threshold value; and
control an output device to output the specific sound to the first user, wherein the specific sound is output to the first user based on the controlled volume level of the specific sound.

2. The information processing device according to claim 1, wherein the information processing device comprises a neckband speaker.

3. The information processing device according to claim 1, wherein
the CPU is further configured to acquire review information from the first user, and
the review information is associated with the outputted specific sound of the word-of-mouth information.

4. The information processing device according to claim 1, wherein
the word-of-mouth information is output by the second user within a specific time period, and
the specific time period is from a specific time to a current time.

5. The information processing device according to claim 1, wherein the CPU is further configured to:
control an ambient sound to overlap with the specific sound; and
control the output device to output the specific sound that is overlapped with the ambient sound.

6. The information processing device according to claim 1, wherein the CPU is further configured to search the word-of-mouth information based on the latent demand and at least one of attribute information, preference information, a history of action information, or plan information associated with the first user.

7. The information processing device according to claim 1, wherein the CPU is further configured to recognize the current user condition based on at least one of action information, position information, plan information, biological information, or environmental information associated with the first user.

8. The information processing device according to claim 1, wherein the CPU is further configured to control conversion of the searched word-of-mouth information into a melody.

9. An information processing method, comprising:
controlling, by a processor, estimation of a latent demand of a first user based on a current user condition of the first user;
searching word-of-mouth information based on the latent demand of the first user, wherein
the word-of-mouth information is output by a second user in a region within proximity of the first user, and
the second user is different from the first user;
converting the searched word-of-mouth information to a specific sound;
controlling a volume level of the specific sound to a specific value lower than a threshold value; and
controlling an output device to output the specific sound to the first user,
wherein the specific sound is output to the first user based on the controlled volume level of the specific sound.

10. A non-transitory computer-readable medium having stored thereon, computer-executable instructions which, when executed by a computer, cause the computer to execute operations, the operations comprising:
controlling estimation of a latent demand of a first user based on a current user condition of the first user;
searching word-of-mouth information based on the latent demand of the first user, wherein
the word-of-mouth information is output by a second user in a region within proximity of the first user, and
the second user is different from the first user;
converting the searched word-of-mouth information to a specific sound;
controlling a volume level of the specific sound to a specific value lower than a threshold value; and
controlling an output device to output the specific sound to the first user, wherein the specific sound is output to the first user based on the controlled volume level of the specific sound.

* * * * *